US009909582B2

(12) United States Patent
Campion et al.

(10) Patent No.: US 9,909,582 B2
(45) Date of Patent: Mar. 6, 2018

(54) PUMP WITH PLUNGER HAVING TRIBOLOGICAL COATING

(71) Applicant: Caterpillar Inc., Peoria, IL (US)

(72) Inventors: Robert Michael Campion, Chillicothe, IL (US); John Jay Truhan, Jr., Peoria, IL (US); Joshua Steffen, El Paso, IL (US); Shivangini Singh Hazari, Peoria, IL (US); Steven Charles Taylor, Germantown Hills, IL (US); Michael James Pollard, Peoria, IL (US); Alan Ray Stockner, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 464 days.

(21) Appl. No.: 14/611,129

(22) Filed: Jan. 30, 2015

(65) Prior Publication Data

US 2016/0222959 A1   Aug. 4, 2016

(51) Int. Cl.
| | | |
|---|---|---|
| *F16J 1/01* | (2006.01) |
| *F04B 53/14* | (2006.01) |
| *F04B 53/00* | (2006.01) |
| *F16J 1/00* | (2006.01) |

(52) U.S. Cl.
CPC ............ *F04B 53/14* (2013.01); *F04B 53/007* (2013.01); *F05C 2201/0406* (2013.01); *F05C 2201/046* (2013.01); *F05C 2201/0466* (2013.01); *F05C 2203/08* (2013.01); *F05C 2203/0813* (2013.01); *F05C 2203/0882* (2013.01); *F05C 2211/00* (2013.01); *F05C 2225/04* (2013.01); *F05C 2251/14* (2013.01); *F05C 2253/06* (2013.01); *F05C 2253/12* (2013.01); *F16J 1/006* (2013.01); *F16J 1/01* (2013.01)

(58) Field of Classification Search
CPC ................. F16J 1/006; F16J 1/01; F16J 10/02
See application file for complete search history.

(56) References Cited

U.S. PATENT DOCUMENTS

| | | | |
|---|---|---|---|
| 2,837,898 A | 6/1958 | Ahlstrand |
| 3,136,136 A | 6/1964 | Gottzmann |
| 4,239,463 A | 12/1980 | Yaindl |
| 4,376,377 A | 3/1983 | Duron et al. |
| 4,393,752 A | 7/1983 | Meier |

(Continued)

FOREIGN PATENT DOCUMENTS

| | | |
|---|---|---|
| CA | 2 546 315 A1 | 11/2006 |
| CN | 101403381 A | 4/2009 |

(Continued)

OTHER PUBLICATIONS

U.S. Appl. No. 14/597,019, titled "Bearing Arangement for Cryogenic Pump," filed Jan. 14, 2015, 21 pages.

*Primary Examiner* — F. Daniel Lopez
(74) *Attorney, Agent, or Firm* — Finnegan, Henderson, Farabow, Garrett & Dunner, LLP

(57) ABSTRACT

A pump is disclosed. The pump may include at least one pumping mechanism. The at least one pumping mechanism may include a barrel formed of a substrate having a bore and a plunger formed of a substrate and slidably disposed within the bore in the barrel. The pump may further include a coating disposed on the plunger. The coating may include a main layer containing a tribological material and a sacrificial break-in layer disposed on the main layer, the break-in layer containing a tribological material.

16 Claims, 4 Drawing Sheets

(56) References Cited

U.S. PATENT DOCUMENTS

| | | |
|---|---|---|
| 4,396,362 A | 8/1983 | Thompson et al. |
| 4,576,557 A | 3/1986 | Pevzner |
| 5,085,563 A | 2/1992 | Collins et al. |
| 5,127,230 A | 7/1992 | Neeser et al. |
| 5,265,431 A | 11/1993 | Gaudet et al. |
| 5,509,792 A | 4/1996 | Sullivan et al. |
| 5,511,955 A | 4/1996 | Brown et al. |
| 5,522,709 A | 6/1996 | Rhoades |
| 5,809,863 A | 9/1998 | Tominaga et al. |
| 5,860,798 A | 1/1999 | Tschopp |
| 6,006,525 A | 12/1999 | Tyree, Jr. |
| 6,056,520 A | 5/2000 | Nguyen et al. |
| 6,149,073 A | 11/2000 | Hickey et al. |
| 6,481,218 B1 | 11/2002 | Drelser |
| 6,663,350 B2 | 12/2003 | Tyree, Jr. |
| 6,722,866 B1 | 4/2004 | Dresler |
| 6,898,940 B2 | 5/2005 | Gram et al. |
| 6,901,911 B2 | 6/2005 | Anderson et al. |
| 7,134,851 B2 | 11/2006 | Chenoweth |
| 7,270,719 B2* | 9/2007 | Berglund ............ C22C 38/001 148/225 |
| 8,790,091 B2 | 7/2014 | Mehta et al. |
| 8,915,719 B2* | 12/2014 | Street .................. F04B 15/08 123/41.34 |
| 2004/0144318 A1* | 7/2004 | Beck .................... C23C 14/06 118/723 R |
| 2007/0090606 A1* | 4/2007 | Ross .................... F04B 15/08 277/500 |
| 2010/0037967 A1 | 2/2010 | Lu |
| 2010/0180607 A1* | 7/2010 | Duong ................. F04B 15/08 62/50.6 |
| 2013/0306029 A1 | 11/2013 | Stockner et al. |
| 2014/0109599 A1 | 4/2014 | Lefevre et al. |
| 2014/0116396 A1 | 5/2014 | Stockner |
| 2014/0130522 A1 | 5/2014 | Steffen et al. |
| 2014/0174106 A1 | 6/2014 | Tang et al. |
| 2014/0182559 A1 | 7/2014 | Steffen et al. |
| 2014/0216403 A1 | 8/2014 | Stockner |

FOREIGN PATENT DOCUMENTS

| | | |
|---|---|---|
| DE | 3515757 A1 | 11/1986 |
| KR | 10-1104171 B1 | 1/2012 |
| KR | 10-2013-0089584 A | 8/2013 |
| WO | WO 99/13229 A1 | 3/1999 |

* cited by examiner

PUMP WITH PLUNGER HAVING TRIBOLOGICAL COATING

TECHNICAL FIELD

The present disclosure relates generally to a pump and, more particularly, to a pump with a plunger having a tribological coating.

BACKGROUND

Gaseous fuel powered engines are common in many applications. For example, the engine of a locomotive can be powered by natural gas (or another gaseous fuel) alone, or by a mixture of natural gas and diesel fuel. Natural gas may be more abundant and, therefore, less expensive than diesel fuel. In addition, natural gas may burn cleaner in some applications.

Natural gas, when used in a mobile application, may be stored in a liquid state onboard the associated machine. This may require the natural gas to be stored at cold temperatures, typically about −100 to −162° C. The liquefied natural gas (LNG) may then be drawn from the tank by gravity and/or by a boost pump and directed to a high-pressure pump. The high-pressure pump further increases a pressure of the fuel and directs the fuel to the machine's engine. In some applications, the liquid fuel is gasified prior to injection into the engine and/or mixed with diesel fuel (or another fuel) before combustion.

One problem associated with conventional high-pressure pumps involves lubricating the moving parts of the pump. Generally tight tolerances between moving parts, such as between plungers that reciprocate within barrels of pumping mechanisms, may create friction between the moving parts, thereby requiring more energy to drive the pump. Further, the friction may cause scuffing, wearing, and/or sticking of the plungers, barrels, or seals between the plungers and barrels, which can reduce the lifespan of the pump. Whereas diesel fuel may be more naturally lubricious and may lubricate plungers, barrels, and seals during operation of the pump, gaseous fuels generally have lower lubricity and may not provide sufficient lubrication.

One attempt to reduce friction within a fuel pump is disclosed in U.S. Pat. No. 7,134,851 (the '851 patent) that issued to Chenoweth on Nov. 14, 2006. In particular, the '851 patent discloses a reciprocating pump having a pump body and a plunger housing disposed in the pump body. The plunger housing defines a bore, and a plunger slides within the bore to draw fuel through an inlet of the pump and force the fuel through an outlet. A relatively small clearance is maintained between the plunger and the bore of the plunger housing to prevent leakage past the plunger. The plunger and/or plunger housing are formed of a ceramic material to reduce wear of the plunger and the cylinder.

While the pump of the '851 patent may reduce some fuel leakage and wearing of the plunger and/or plunger housing, it may not be suitable for primping low-temperature cryogenic fluids, such as LNG. Particularly, ceramic plungers and plunger housings may not be sufficiently lubricious at cryogenic temperatures to prevent wearing or sticking. Further, a difference in thermal expansion between ceramic plungers and plunger housings over a range of working temperatures may cause fuel leakage or wearing, thereby reducing the overall efficiency of the pump.

The disclosed pump is directed to overcoming one or more of the problems set forth above and/or other problems of the prior art.

SUMMARY

In one aspect, the present disclosure is directed to a pump. The pump may include at least one pumping mechanism. The at least one pumping mechanism may include a barrel formed of a substrate having a bore and a plunger formed of a substrate and slidably disposed within the bore in the barrel. The pump may further include a coating disposed on the plunger. The coating may include a main layer containing a tribological material and a sacrificial break-in layer disposed on the main layer, the break-in layer containing a tribological material.

In another aspect, the present disclosure is directed to a method of forming a pump. The method may include providing a plunger and applying a coating to the plunger. Applying the coating may include applying a main layer of the coating to the plunger, the main layer containing a tribological material. Applying the coating may also include applying a sacrificial break-in layer of the coating to the main layer, the break-in layer containing a tribological coating. The method may further include slidably disposing the plunger within a bore, the bore being located in a barrel.

In yet another aspect, the present disclosure is directed to a pump. The pump may include at least one pumping mechanism configured to be fondly connected to a source of cryogenic fluid. The at least one pumping mechanism may include a barrel formed of stainless steel. The barrel may include a bore having a nickel-plated surface. The at least one pumping mechanism may further include a plunger formed of stainless steel, the plunger being slidably disposed within the bore in the barrel. The at least one pumping mechanism may be configured to pressurize the cryogenic fluid between the plunger and the barrel. The pump may further include a coating disposed on the plunger. The coating may include a support layer containing a diamond-like carbon (DLC) material. The coating may also include a main layer disposed on the support layer, the main layer containing amorphous diamond-like carbon (ADLC). The coating may further include a sacrificial break-in layer disposed on the main layer, the break-in layer containing a DLC material.

DETAILED DESCRIPTION

Reference will now be made in detail to exemplary embodiments that are illustrated in the accompanying drawings. Wherever possible, the same reference numbers will be used throughout the drawings to refer to the same or like parts.

Figure 1:
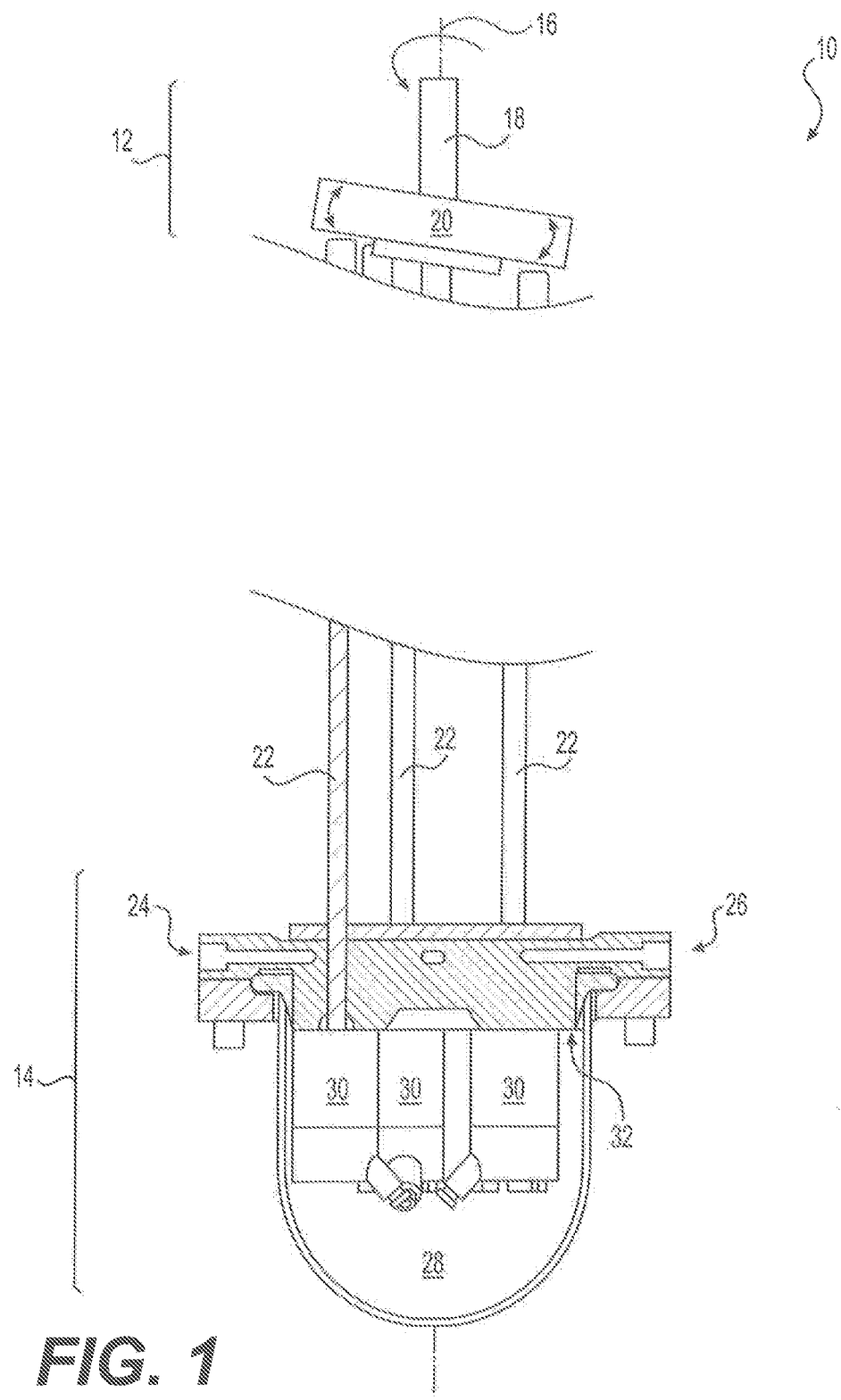
FIG. 1 is a schematic illustration of an exemplary disclosed pump.

FIG. 1 illustrates a pump 10 that may be used to supply a pressurized fluid. For example, pump 10 may be a pump used to provide pressurized fuel, such as a cryogenic fluid (e.g., liquefied natural gas (LNG), helium, hydrogen, nitrogen, or oxygen) to a fuel consumer, such as a gaseous fuel-powered engine. It is contemplated, however, that pump 10 may supply other gaseous fuel consumers.

Pump 10 may be mechanically driven by an external source of power (e.g., an engine or a motor) at an input end 12 to generate a high-pressure fluid discharge at an output end 14. In this example, input end 12 and output end 14 may be aligned along a common axis 16, and connected end-to-end. For example, pump 10 may be an axial plunger type pump. Other configurations may be possible.

Input end 12 may include a driveshaft 18 rotatably supported within a housing (not shown), and connected at an internal end to a load plate 20. Load plate 20 may be oriented at an oblique angle relative to axis 16, such that an input rotation of driveshaft 18 may be converted into a corresponding undulating motion of load plate 20. A plurality of tappets (not shown) may slide along a lower face of load plate 20, and a push rod 22 may be associated with each tappet. In this way, the undulating motion of load plate 20 may be transferred through the tappets to push rods 22 and used to pressurize the fluid passing through pump 10. A resilient member (not shown), for example a coil spring, may be associated with each push rod 22 and configured to bias the associated tappet into engagement with load plate 20. Each push rod 22 may be a single-piece component or, alternatively, comprised of multiple pieces, as desired. Many different shaft/load plate configurations may be possible, and the oblique angle of load plate 20 may be fixed or variable, as desired. Other configurations of input end 12 may be possible.

Output end 14 may be in fluid communication with a cryogenic fired source via an inlet 24 and an outlet 26. For example, LNG may be supplied to output end 14 from an associated storage tank storing LNG at temperatures of, e.g., about −100 to −162° C. In some embodiments, LNG may be supplied to output end 14 at less than about −140° C. or less than about −120° C. This continuous supply of cold fluid to output end 14 may cause output end 14 to be significantly cooler than input end 12. Cryogenic fluid may be directed through inlet 24 to a reservoir 28 in output end 14.

Output end 14 may include one or more pumping mechanisms 30 fluidly connected to reservoir 28 to draw cryogenic fluid from reservoir 28. In the exemplary embodiment, output end 14 has five pumping mechanisms 30, but it is understood that there may be more or fewer than five pumping mechanisms 30. Pumping mechanisms 30 may be mounted to a surface 32 disposed in output end 14 and may extend into reservoir 28. Push rods 22 may extend through surface 32 and extend into each pumping mechanism 30.

Figure 2:
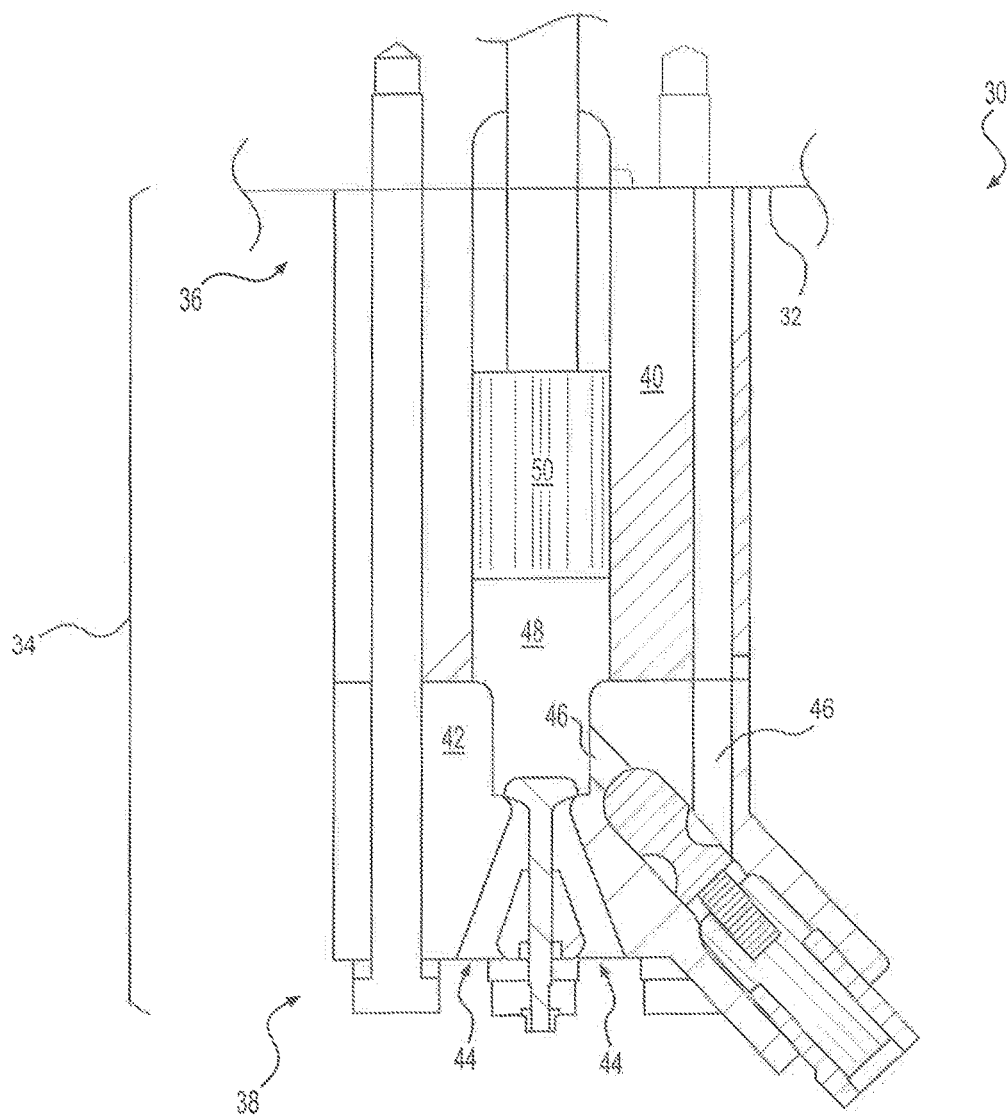
FIG. 2 is a cross sectional view of an exemplary disclosed pumping mechanism of the pump of FIG. 1.

As shown in FIG. 2, each pumping mechanism 30 may include a barrel assembly 34 including a base or proximal end 36 and a distal end 38 opposite proximal end 36. The terms "proximal" and "distal" are used herein to refer to the relative positions of the components of exemplary barrel assembly 34. When used herein, "proximal" refers to a position relatively closer to the end of barrel assembly 34 connected to surface 32. In contrast, "distal" refers to a position relatively further away from the end of the barrel assembly 34 that is connected to surface 32.

Barrel assembly 34 may include a generally hollow barrel 40 formed at proximal end 36 and a head 42 formed at distal end 38. Barrel 40 may include a barrel substrate 58 (FIG. 3) formed of a suitable material that can withstand changes from ambient temperatures to cryogenic temperatures and continued operation at such temperatures. A suitable material may resist cracking or other mechanical failures and may nave low thermal expansion properties. For example, barrel 40 may be formed of a type of stainless steel that is suitable for operation at such low temperatures. In particular, barrel 40 may be formed of 17-4 PH H1150M stainless steel. However, it is understood that barrel 40 may be formed of another material, such as another type of steel, a different metal, or a ceramic material.

Head 42 may be attached to barrel 40 to close off barrel 40. Alternatively, barrel assembly 34, including barrel 40 and head 42, may be formed integrally as a single component. Head 42 may include at least one inlet 44 in fluid communication with reservoir 28 for drawing cryogenic fluid from reservoir 28 into barrel assembly 34. Head 42 may also include at least one outlet 46 in fluid communication with outlet 26 and an outlet conduit for transferring pressurized cryogenic fluid from barrel assembly 34 to the fuel consumer.

A plunger bore 48 may extend through barrel 40 and may be configured to receive a plunger 50 for sliding within plunger bore 48. A proximal end of plunger bore 48 may also align with push rod 22 such that push rod 22 may contact and slide plunger 50 through plunger bore 48. For example, the undulation of load plate 20 may cause push rod 22 to move toward and push against plunger 50. Alternatively, plunger 50 may be connected to push rod 22, and the undulation of load plate 20 may cause push rod 22 to move plunger 50. During the ensuing plunger movement, high pressure may be generated within pumping mechanism 30 by the volume contracting inside plunger bore 48.

Plunger 50 may slide between a Bottom-Dead-Center position (BDC) and a Top-Dead-Center (TDC) position within plunger bore 48. While plungers 50 reciprocate between BDC and TDC, fuel may leak past plungers 50 into the proximal ends of the respective plunger bores 48 due to the pressure differential between the pressure acting on the distal end of plunger 50 and the pressure acting on the proximal end of plunger 50. Plunger 50 may be formed without an external seal (e.g., a piston seal, such as a plastic or non-metallic component disposed on the outer surface of the plunger 50), which may wear and limit the life of the pump 10. Alternatively, plungers 50 may include the external seal or other type of seal. To reduce leakage past plungers 50, a small clearance may be maintained between plunger bore 48 and plunger 50.

To further reduce leakage past plungers 50, plungers 50 may include a plunger substrate 60 (FIG. 4) formed of a suitable material that can withstand changes from ambient temperatures to cryogenic temperatures and continued operation at such temperatures. A suitable material may resist cracking or other mechanical failures and may have low thermal expansion properties. In particular, a suitable material may be one with the same or similar thermal expansion properties as the material forming barrel 40. In this way, expansion and contraction of the material forming plunger 50 and barrel 40 may occur at similar rates as temperatures change in pump 10, thereby maintaining a desired clearance between plunger bores 48 and plungers 50 to reduce leakage. For example, plungers 50 may be formed of a type of stainless steel that is suitable for operation at such low temperatures. In particular, plungers 50 may be formed of 17-4 PH H1150M stainless steel. However, it is understood that plungers 50 may be formed of another suitable material, such as another type of steel a different metal, or a ceramic material.

The surfaces of barrel 40, including plunger bores 48, and plungers 50 may be coated with wear resistant tribological materials that may reduce friction between plunger bores 48 and plungers 50 as plungers 50 reciprocate between BDC and TDC. Tribological materials may include materials that are used to reduce friction between and wearing of surfaces in sliding contact. In particular, tribological materials may include wear resistant coatings, plating, lubricants (e.g., dry lubricants, wet lubricants, etc.), and other protective materials that may be applied to a surface to reduce friction and wearing. Reducing the friction between plunger bores 48 and plungers 50 may reduce or prevent scuffing and/or wearing of plunger bores 48 and plungers 50, thereby increasing the lifespan of pump 10. Reducing the friction may also inhibit plungers 50 from heating up and expanding within plunger bores 48, allowing a small clearance between plungers 50 and plunger bores 48 to be maintained and preventing plungers 50 from sticking within plunger bores 48. In this way, the efficiency of pump 10 may be improved.

Figure 4:
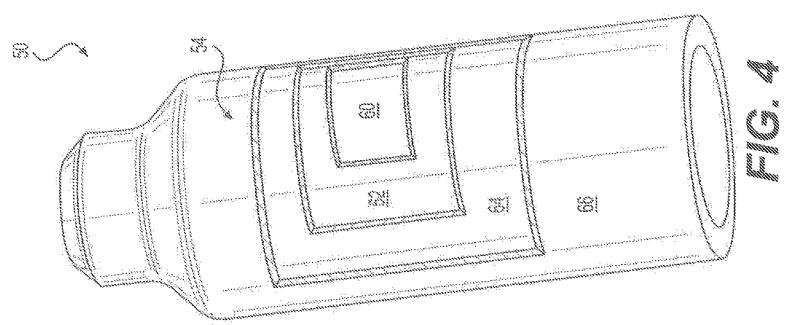
FIG. 4 is a sectioned perspective view of an exemplary disclosed plunger of the pumping mechanism of FIG. 2.
Figure 3:
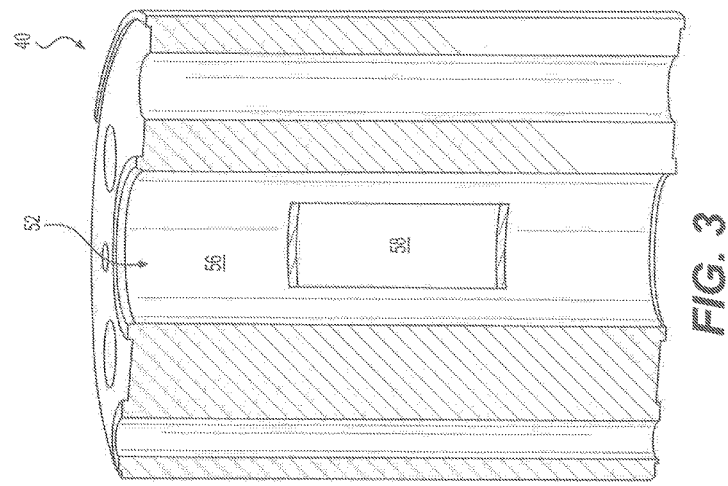
FIG. 3 is a sectioned perspective view of an exemplary disclosed cylinder of the pumping mechanism of FIG. 2.

FIGS. 3 and 4 show barrel 40 coated with a barrel coating 52 and plunger 50 coated with a plunger coating 54. Barrel coating 52 and plunger coating 54 may be different coatings or the same coating, if desired. Each coating may include respective layers, and each layer may contain different materials or the same materials, if desired. Any number of layers may be disposed on barrel 40 and plunger 50 as desired.

Barrel coating 52 may include at least a first layer 56 disposed on barrel substrate 58. First layer 56 of barrel coating may include a hard material for resisting wear under bearing forces, scuffing, and friction between plunger bore 48 and plunger 50. First layer 56 of barrel coating 52 may also include a material having a coefficient of thermal expansion that matches or is sufficiently similar to that of barrel substrate 58 to reduce cracking and/or delamination during temperature changes and operation of pump 10. For example, first layer 56 of barrel coating 52 may include metal plating such as, for example, nickel plating or chrome plating. In this example, first layer 56 of barrel coating 52 may include nickel plating applied by an electroless process. Due to its hardness and toughness at low temperatures, electroless nickel plating may be applied as a thin layer such that the likelihood of cracking during thermal expansion may be reduced. It is understood, however, that a different metal plating applied by the same or another process may be used, if desired.

First layer 56 of barrel coating 52 may also be impregnated with other materials to provide additional or improved tribological properties (e.g., lubricity, wear resistance, hardness, etc.) to first layer 56. Additional materials may include materials that cart be impregnated in first layer 56 and maintain lubricity at cryogenic temperatures. Such tribological materials may include, for example, polytetrafluroethylene (PTFE), materials containing molybdenum disulfide ($MoS_2$), such as titanium molybdenum sulfide ($TiMoS_2$), and/or another suitable materials. It is understood that other tribological materials may be included in first layer 56 of barrel coating 52. It is further understood that additional layers of barrel coating 52 may be included, if desired.

Plunger coating 54 may include a plurality of layers disposed on plunger substrate 60. Due to the low clearance maintained between plunger bore 48 and plunger, the layers of plunger coating 54 may be thin layers, and the overall thickness of plunger coating 54 may be small enough to avoid the effects of relative thermal expansion and reduce the likelihood of coating bond failure as well as increasing or decreasing the desired clearance between plunger bores 48 and plungers 50. In this example, plunger coating may have an overall thickness of about 4-6 microns such as, for example, about 5 microns. It is understood, however, that plunger coating 54 may be thicker or thinner, if desired.

Plunger coating 54 may include a support layer 62 disposed on plunger substrate 60, a main layer 64 disposed on support layer 62, and a sacrificial break-in layer 66 disposed on main layer 64. Layers 62-66 may include tribological materials and may cooperate with each other and with barrel coating 52 to reduce friction and wearing between plunger bore 48 and plunger 50 during operation of pump 10 at cryogenic temperatures.

Support layer 62 may be disposed on plunger substrate 60 to provide support to main layer 64 by absorbing some of the stresses caused by bearing forces and thermal expansion. Support layer 62 may be hard and wear resistant, but may be slightly less hard, thinner, and more flexible than main layer 64. For example, support layer 62 may contain a diamond-like carbon (DLC) material applied to plunger 50 using a physical vapor deposition (PVD) process, such as unbalanced magnetron sputtering.

In particular, support layer 62 may contain tungsten DLC (W-DLC) and may be about 0.5-1.5 microns thick. Support layer 62 may be thinner or thicker, if desired, and it is understood that increasing the thickness of support layer 62 may increase the effects of thermal expansion experienced by support layer 62. The ratio of carbon to tungsten in W-DLC may be selected to achieve a desired compromise between wear resistance and toughness in support layer 62. For example, a greater tungsten-to-carbon ratio may improve wear resistance, but may increase brittleness of support layer 62. Other metal-doped DLC materials such as titanium DLC (Ti-DLC), cobalt DLC (Co-DLC), copper DLC (Cu-DLC), chromium DLC (Cr-DLC), etc., may alternatively or additionally be used, if desired. It is understood that other tribological materials, such as chromium carbide, and other application process may be used alternatively or in addition to a DLC material, if desired.

A thin adhesive layer of chrome (not shown) may be applied between substrate 60 and support layer 62. Applying a thin layer of chrome to plunger substrate 60 may prevent delamination of support layer 62 and may reduce stresses caused by thermal expansion differences between plunger substrate 60 (e.g., containing steel) and support layer 62.

Main layer 64 may be disposed on support layer 62 and provide a main wear surface for lubricating sliding movements of plunger 50 within plunger bore 48. Main layer 64 may contain tribological materials that may be harder, more wear resistant, and/or more lubricious than support layer 62. For example, main layer 64 may contain DLC materials such as amorphous diamond-like carbon (ADLC), applied using a plasma-assisted chemical vapor deposition (CVD) process, it is understood that other tribological materials and other application processes may be used if desired.

ADLC is relatively highly lubricious, hard, and wear resistant at cryogenic temperatures. For example, ADLC may have a Vickers hardness of 2000-2200 HV. ADLC may also be applied in thin layers using the plasma-assisted CVD process. In this example, main layer 64 may be about 1.5-3.0 microns (e.g., about 2-2.5 microns) thick. Such a relatively thin layer of ADLC may reduce the effects of thermal expansion, thereby reducing leakage between plunger bore 48 and plunger 50, and obviating the need far seals between plunger bore 48 and plunger 50.

On a nano-scale, main layer 64 (e.g., containing ADLC and/or other relatively harder material) may be relatively abrasive to plunger bores 48 until plunger coating 54 and barrel coating 52 are broken-in, e.g., after plunger 50 slides between BDC and TDC within plunger bore 48 for a period of time. However, the break-in process may substantially wear barrel coating 52 and/or plunger bore 48, thereby decreasing the lifespan of pump 10. Accordingly, break-in layer 66 may be disposed on main layer 64 to reduce wearing of barrel coating 52 during the break-in process.

Break-in layer 66 may be a thin layer (e.g., about 1-2 microns) containing a DLC material. Further, break-in layer 66 may be configured to wear away from main layer 64 and be deposited on plunger bore 48 during the break-in process. That is, break-in layer 66 may be a sacrificial layer. In some embodiments, applying a DLC coating on top of barrel coating 52 may not be practical due to constraints of the DLC application process and to the geometry of barrel 40. Thus, break-in layer 66 may be applied to main layer 64 and configured to wear away from main layer and adhere to plunger bore 48. Alternatively, break-in layer 66 may be formed on top of barrel coating 52 rather than on main layer 64.

Break-in layer 66 may contain one or more of a DLC material, such as W-DLC, and other tribological materials. As discussed above, the tungsten-to-carbon ratio of W-DLC may be adjusted to make break-in layer 66 harder or softer as desired. In this example, break-in layer 66 may be softer than support layer 62 and may include a lower tungsten-to-carbon ratio. By lowering this ratio, break-in layer 66 may be soft enough to be transferred from main layer 64 to plunger bore 48 to reduce the wearing of plunger bore 48 by main layer 64.

It is understood that other tribological materials may be used alternatively or in addition to a DLC material in break-in layer 66, if desired. For example, the PVD process may be used to apply other tribological materials, such as, for example, $MoS_2$ or pure carbon. Alternatively, different processes may be used to apply different tribological materials, such as $TiMoS_2$. The addition of titanium to $MoS_2$ may increase the wear resistance of $MoS_2$, which is a highly lubricious material. Further, tribological materials containing ceramic materials may alternatively be used. For example, in place of a material applied using the PVD process, ceramic materials may be applied using a thermal spray process. In particular, break-in layer 66 may contain a zirconia thermal spray. The zirconia thermal spray may be lubricious at cryogenic temperatures but may be thicker than materials applied using the PVD process. The zirconia thermal spray may be, for example, about 50-100 microns thick.

INDUSTRIAL APPLICABILITY

Figure 5:
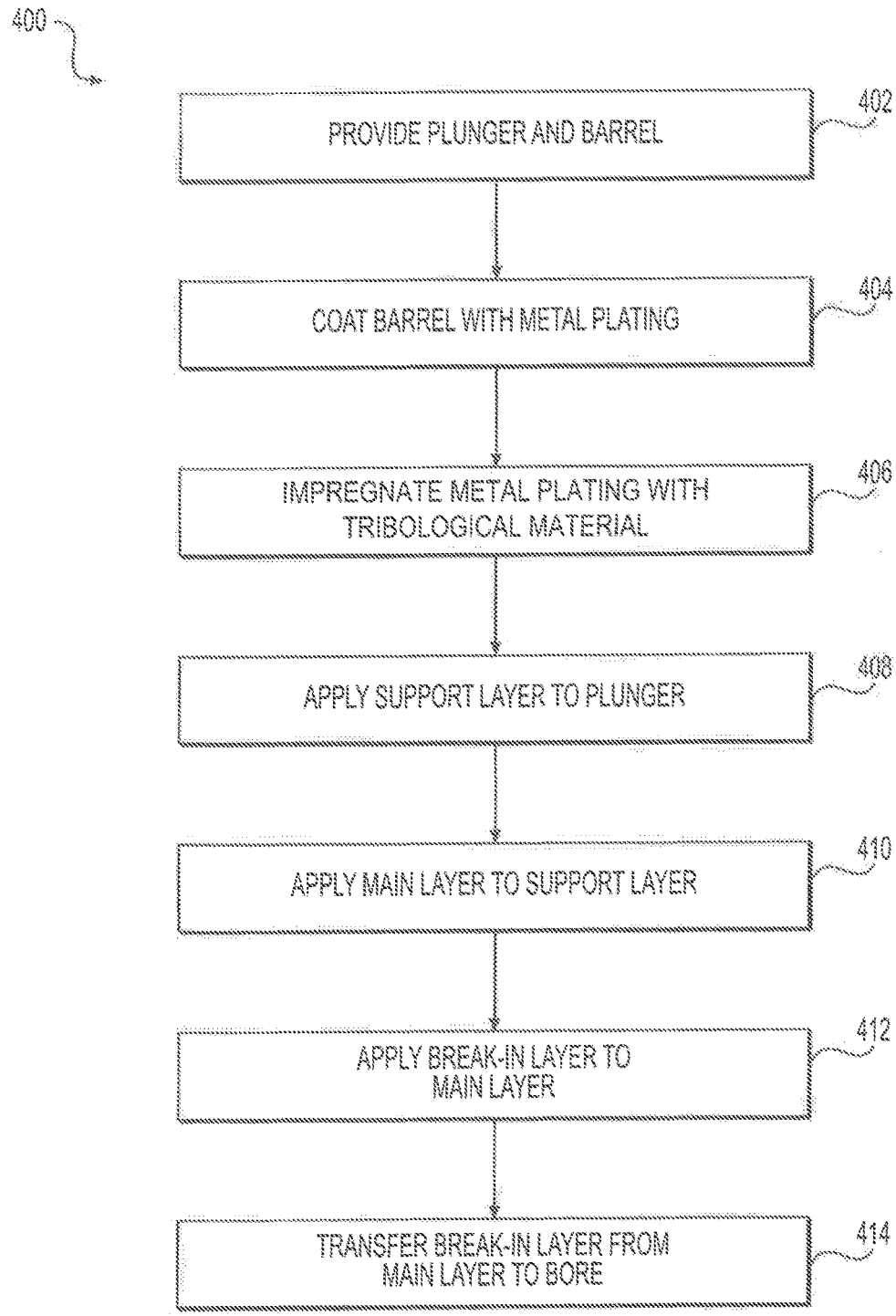
FIG. 5 is a flow chart showing an exemplary method of forming the pump of FIG. 1.

The disclosed pump finds potential application in any fluid system where friction and wearing of internal parts is undesirable, especially at low temperatures. The disclosed pump finds particular applicability in cryogenic applications, for example power system applications having engines that burn LNG fuel. One skilled in the art will recognize, however, that the disclosed pump could be utilized in relation to other fluid systems that may or may not be associated with a power system. A method of forming pump 10 will now be explained with reference to FIG. 5.

A method 400 of forming pump 10 may begin by providing barrel 40 and plunger 50 (Step 402) that have been formed from barrel substrate 58 and plunger substrate 60, respectively. In this example, barrel substrate 58 and plunger substrate 60 may include stainless steel, such as 17-4 PH H1150M stainless steel, in other embodiments, barrel substrate 58 and plunger substrate 60 may include other types of stainless steel or ceramic materials, if desired. Barrel substrate 58 and plunger substrate 60 may include the same or different materials, if desired.

Due to the geometry of barrel 40 and plunger bore 48, barrel 40 and plunger 50 may be coated in separate steps. For example, first layer 56 of metal plating may first be applied to plunger bore 48 of barrel 40 (Step 404). It is understood that although barrel 40 is described as being coated before plunger 50, steps 404-414 may be performed in a different order, and plunger 50 may alternatively be coated before barrel 40. Metal plating, such as nickel plating, may be applied to barrel 40 and plunger bore 48 using an electroless process. The electroless process is suitable for applying thin coatings of metal plating, which may reduce the effects of thermal expansion differences between plunger bore 48 and plunger 50, as compared to thicker types of plating. It is understood that other metals and other application processes may be used to plate barrel 40 and plunger bore 48.

The metal plating of first layer 56 may be impregnated with one or more tribological materials (Step 406). Tribological materials, such as PTFE or other materials, such as materials containing $MoS_2$, may be impregnated in the metal plating of first layer 56 in order to increase the lubricity of barrel coating 52. It is understood that other tribological materials may be used to impregnate the metal plating of first layer 56, and also that the tribological materials may be impregnated in the metal plating before being applied to the barrel 40.

Support layer 62 of plunger coating 54 may then be applied to plunger substrate 60 of plunger 50 using a PVD process (Step 408). Support layer 62 may include a tribological material such as W-DLC. The tungsten-to-carbon ratio of W-DLC for use with support layer 62 may be set to any desirable ratio for achieving a desired hardness and toughness for absorbing stresses from thermal expansion during temperature changes (e.g., when pump 10 is primed). It is understood that other tribological materials may be used, such as chromium carbide. In this example, the PVD process may include unbalanced magnetron sputtering in order to achieve a more dense coating. Further, PVD processes are advantageous because they can be used to apply tribological materials, such as DLC coatings, to metal substrates, such as stainless steel, at low temperatures. This low-temperature process is advantageous for applying DLC coatings to stainless steel substrates because the risk of heating the substrate to a temperature that can alter the substrate's tempering is reduced. It is understood, however, that other PVD processes may be used to apply support layer 62.

Main layer 64 of plunger coating 54 may then be applied to plunger 50 on top of support layer 62 (Step 410). Main layer 64 may contain a tribological material such as ADLC. ADLC may be applied using a plasma-assisted CVD process. Plasma-assisted CVD may be performed at lower temperatures than other CVD processes, thereby reducing the risk that the tempering of plunger substrate 60 (e.g., containing stainless steel) is altered. It is understood that other application processes may be used to apply main layer 64.

Break-in layer 66 of plunger coating 54 may then be applied to plunger 50 on top of main layer 64 (Step 412). Break-in layer 66 may be a sacrificial layer containing a tribological material, such as W-DLC, and may be configured to wear away from main layer 64 and be deposited onto plunger bore 48. A PVD process may be used to apply break-in layer 66. The acetylene partial pressure of the PVD process may be increased and the tungsten-to-carbon ratio of W-DLC may be decreased in order to soften break-in layer 66 and to allow it to transfer to plunger bore 48. It is understood that other tribological materials and application processes may be used to apply break-in layer 66. Although break-in layer 66 may be applied to plunger bore 48, break-in layer 66 may be applied instead to main layer 64 in some embodiments because PVD processes may involve a line-of-sight application of tribological materials to a work surface. Accordingly, in some embodiments, the application equipment for performing PVD processes may more effectively apply a tribological coating to an outer surface of plunger 50 as opposed to an inner surface of barrel 40, such as plunger bore 48.

Break-in layer 66 may include other tribological materials such as TiMoS$_2$ and/or ceramic materials, which may be applied using other application processes, alternatively or in addition to a DLC material. For example, in other embodiments, step 412 may include applying a ceramic material using a thermal spray process instead of applying a material using a PVD process. In particular, a zirconia thermal spray may be used. The zirconia thermal spray be lubricious at cryogenic temperatures, but may be thicker than materials applied using the PVD process. If a ceramic material is applied at step 412, such as a zirconia thermal spray, additional steps may be required in order to grind, polish, or otherwise finish the surface of the ceramic material.

After coating both barrel 40 and plunger 50, plunger 50 may be inserted into plunger bore 48 of barrel 40, and barrel 40 and plunger 50 may be assembled into barrel assembly 34 and into pumping mechanism 30. Plunger bore 48 may then be fluidly connected to a source of cryogenic fluid, such as liquefied natural gas, helium, hydrogen, nitrogen, or oxygen, and pump 10 may be driven to slide plunger 50 through plunger bore 48 to transfer break-in layer 66 from main layer 64 to plunger bore 48, thereby breaking-in barrel 40 and plunger 50 (Step 414).

It will be apparent to those skilled in the art that various modifications and variations can be made to the pump of the present disclosure. Other embodiments of the pump will be apparent to those skilled in the art front consideration of the specification and practice of the pump disclosed herein. It is intended that the specification and examples be considered as exemplary only, with a true scope being indicated by the following claims and their equivalents.

What is claimed is:

1. A pump comprising:
   at least one pumping mechanism including:
      a barrel formed of a barrel substrate having a bore; and
      a plunger formed of a plunger substrate and slidably disposed within the bore in the barrel; and
   a coating disposed on the plunger, the coating including
      a support layer disposed on the plunger substrate, the support layer containing a support layer tribological material containing at least one of a DLC material and chromium carbide,
      a main layer disposed on the support layer, the main layer containing a main layer tribological material, and
      a sacrificial break-in layer disposed on the main layer, the break-in layer containing a break-in layer tribological material.

2. The pump of claim 1, wherein the main layer tribological material contains amorphous diamond-like carbon (ADLC).

3. The pump of claim 1, wherein the break-in layer tribological material contains at least one of a diamond-like carbon (DLC) material, titanium molybdenum disulfide (TiMoS$_2$), or a ceramic material.

4. The pump of claim 1, wherein the bore is coated with a metal plating.

5. The pump of claim 4, wherein the metal plating includes nickel or chrome.

6. The pump of claim 4, wherein the metal plating is impregnated with a tribological material.

7. The pump of claim 6, wherein the metal plating tribological material includes polytetrafluroethylene (PTFE).

8. The pump of claim 1, wherein the barrel substrate includes stainless steel and the plunger substrate includes stainless steel or a ceramic.

9. The pump of claim 8, wherein stainless steel includes 17-4 PH H1150-M stainless steel.

10. A method of forming a pump, the method comprising:
    providing a plunger;
    applying a coating to the plunger, wherein applying the coating includes
       applying a support layer of the coating to a substrate of the plunger, the support layer including a support layer tribological material containing at least one of a DLC material and chromium carbide,
       applying a main layer of the coating to the support layer, the main layer containing a main layer tribological material; and
       applying a sacrificial break-in layer of the coating to the main layer, the break-in layer containing a break-in layer tribological material; and
    slidably disposing the plunger within a bore, the bore being located in a barrel.

11. The method of claim 10, wherein the main layer tribological material contains amorphous diamond-like carbon (ADLC).

12. The method of claim 10, wherein the break-in layer tribological material contains at least one of a diamond-like carbon (DLC) material, titanium molybdenum disulfide (TiMoS$_2$), or a ceramic material.

13. The method of claim 10, further including applying a metal plating to the bore.

14. The method of claim 13, wherein the metal plating is impregnated with a tribological material.

15. The method of claim 10, further including wearing away a portion of the break-in layer from the main layer thereby transferring material to the bore in the barrel.

16. A pump comprising:
    at least one pumping mechanism configured to be fluidly connected to a source of cryogenic fluid, the at least one pumping mechanism including:
       a barrel formed of stainless steel, the barrel including a bore, the bore having a nickel-plated surface; and
       a plunger formed of stainless steel, the plunger being slidably disposed within the bore in the barrel, wherein the at least one pumping mechanism is configured to pressurize the cryogenic fluid between the plunger and the barrel; and
       a coating disposed on the plunger, the coating including:
          a support layer containing a diamond-like carbon (DLC) material;
          a main layer disposed on the support layer, the main layer containing amorphous diamond-like carbon (ADLC); and a sacrificial break-in layer disposed on the main layer, the break-in layer containing a DLC material.

\* \* \* \* \*